(12) United States Patent  
Clements (10) Patent No.: US 11,060,560 B2  
(45) Date of Patent: Jul. 13, 2021

(54) GEAR PUMP JOURNAL BEARING LUBRICATION FLOW FEED

(71) Applicant: EATON INTELLIGENT POWER LIMITED, Dublin (IE)

(72) Inventor: Martin A. Clements, West Chester, OH (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 392 days.

(21) Appl. No.: 15/767,604

(22) PCT Filed: Oct. 13, 2016

(86) PCT No.: PCT/US2016/056856  
§ 371 (c)(1),  
(2) Date: Apr. 11, 2018

(87) PCT Pub. No.: WO2017/066456  
PCT Pub. Date: Apr. 20, 2017

(65) Prior Publication Data  
US 2018/0298899 A1  Oct. 18, 2018

Related U.S. Application Data

(60) Provisional application No. 62/241,185, filed on Oct. 14, 2015.

(51) Int. Cl.  
*F16C 17/02* (2006.01)  
*F16C 33/10* (2006.01)  
(Continued)

(52) U.S. Cl.  
CPC .......... *F16C 33/1045* (2013.01); *F01C 21/02* (2013.01); *F04C 2/18* (2013.01);  
(Continued)

(58) Field of Classification Search  
CPC .............. F16C 2360/00; F16C 33/1025; F16C 33/103; F16C 33/1045; F16C 33/105; F16C 33/106; F16C 33/1065; F16C 33/1085; F16C 17/02; F16C 17/26; F04C 2/08; F04C 15/00; F04C 15/0023; F04C 15/0026; F04C 2/086; F04C 2/18; F04C 15/0088; F04C 2210/1044; F04C 2210/62; F04C 2240/54; F04C 2240/50; F04C 2240/56; F01C 21/02  
(Continued)

(56) References Cited

U.S. PATENT DOCUMENTS 2,891,483 A     6/1959  Murray et al.  
3,961,870 A *   6/1976  Vlemmings ........ F04C 15/0042  
                                                      418/73  
(Continued)

FOREIGN PATENT DOCUMENTS

EP           0 112 011 B1    9/1987

OTHER PUBLICATIONS

PCT/US2016/056856 International Search Report and Written Opinion, dated Jan. 13, 2017.

*Primary Examiner* — Alan B Waits  
(74) *Attorney, Agent, or Firm* — Fay Sharpe LLP (57) ABSTRACT

A pump bearing member is disclosed for use in a pump bearing assembly and a gear pump assembly.

9 Claims, 8 Drawing Sheets

(51) Int. Cl.
| | |
|---|---|
| *F04C 15/00* | (2006.01) |
| *F16C 17/26* | (2006.01) |
| *F04C 2/18* | (2006.01) |
| *F01C 21/02* | (2006.01) |

(52) U.S. Cl.
CPC ...... *F04C 15/0026* (2013.01); *F04C 15/0088* (2013.01); *F16C 17/02* (2013.01); *F16C 17/26* (2013.01); *F16C 33/105* (2013.01); *F16C 33/1085* (2013.01); *F04C 2210/1044* (2013.01); *F04C 2210/62* (2013.01); *F04C 2240/54* (2013.01); *F16C 2360/00* (2013.01)

(58) Field of Classification Search
USPC .......................................... 418/206.1–206.9
See application file for complete search history.

(56) References Cited

U.S. PATENT DOCUMENTS

| | | | | |
|---|---|---|---|---|
| 4,370,110 | A * | 1/1983 | Nagely | F04C 15/0042 418/132 |
| 4,523,365 | A | 6/1985 | Richmond | |
| 6,213,745 | B1 * | 4/2001 | Woodcock | F16C 33/1065 418/206.7 |
| 6,409,490 | B1 * | 6/2002 | Nemit, Jr. | F01C 21/02 418/201.2 |
| 2012/0219449 | A1 * | 8/2012 | Ni | F04C 2/18 418/206.7 |
| 2016/0032969 | A1 * | 2/2016 | Kovach | F16C 33/1065 384/118 |
| 2016/0208611 | A1 * | 7/2016 | Veilleux, Jr. | B23K 26/34 |
| 2020/0025195 | A1 * | 1/2020 | Poteet | F04C 2/18 |

\* cited by examiner

GEAR PUMP JOURNAL BEARING LUBRICATION FLOW FEED

This application claims the priority benefit of U.S. provisional application Ser. No. 62/241,185, filed Oct. 14, 2015, the disclosure of which is expressly incorporated herein by reference.

BACKGROUND

Many high pressure gear-type pumps use journal style bearings to support the pump gears. These journal bearings are often fed pumped fluid (e.g., fuel) through a small diameter feed orifice to lubricate the rotating interface and limit parasitic usage of pumped flow. In many cases, the pumped fluid being provided to the bearing is not completely void of relatively large particle contaminants. As a result of these contaminants and the construction methods commonly used in gear-type pumps, the contaminants can clog a small diameter lubrication feed orifice and potentially result in bearing issues.

A need exists for an apparatus and method to address these issues.

SUMMARY

This disclosure provides an apparatus and method of providing filtered supply fluid while also providing for a redundant bearing feed architecture in the event that a fluid filtering device (e.g., screen) becomes clogged.

In a preferred arrangement, a pump bearing member includes a bearing body having a bearing lubrication feature. The pump bearing member further includes a protected orifice. A passage is configured to provide a filtered supply fluid if the protected orifice is limited and provide the bearing lubrication.

A pump bearing assembly includes a pair of mating pump bearing members. Each of the pump bearing members includes a bearing body having a bearing lubrication feature. The bearing lubrication feature includes a passage in each bearing body configured to communicate with a protected orifice, and wherein the passages in each bearing member form a common, fluid cavity for each bearing to draw a lubrication flow therefrom.

More particularly, the disclosure is directed to a gear pump assembly that includes a pair of pump gears and a bearing assembly having a pair of mating pump bearings. Each of the pump bearings includes a bearing body having a bearing lubrication feature. The bearing lubrication feature has a protected orifice and a passage in each bearing body configured to form a common, fluid cavity for each bearing to draw a lubrication flow therefrom.

The bearing body in a preferred arrangement includes a journal style bearing that supports intermeshing, first and second gears, and the passage extends between and interconnects opposite sides of a bearing dam.

The protected orifice includes a screen and the passage receives flow passing through the screen.

The bearing lubrication feature includes a bearing flat formed in a portion of the bearing body, and a portion of the passage includes a recess formed in the bearing flat.

The bearing member includes a dam that separates inlet and outlet sides of intermeshing gears of the pump, and the passage extends between and interconnects opposite sides of the dam.

Another aspect of this disclosure relates to a pump bearing assembly that includes mating, first and second pump bearing members. Each of the first and second pump bearing members include a bearing body having a bearing lubrication feature that isolates and receives flow only from a protected orifice to a passage.

The passage in one bearing member of the pump bearing assembly is aligned with the passage in the other bearing member whereby each passage can draw lubrication flow from either protected orifice.

The first and second bearing members of the pump bearing assembly each include a dam that segregates inlet and outlet sides of intermeshing, first and second gears supported by the bearing members, and the passages extend between and interconnect opposite sides of the bearing dams.

The first and second bearing members of the pump bearing assembly each include a flat along a circumferential portion thereof, and each passage includes a recess that extends inwardly from the respective flat so that the recesses are in fluid communication with one another when the flats of the first and second bearing members abut one another.

The first and second bearing members of the pump bearing assembly each include a dam that segregates inlet and outlet sides of intermeshing, first and second gears supported by the bearing members, and the passages extend between and interconnect opposite sides of the bearing dams.

Still another aspect of this disclosure is a gear pump assembly having first and second pump gears. A bearing assembly includes first and second mating pump bearings, each of the pump bearings including a bearing body having a bearing lubrication feature, a flow limiting, protected orifice and a passage configured to receive isolated bearing flow from the protected orifice. The passages in each bearing member align to form a common, fluid cavity from which each bearing can draw lubrication flow.

The protected orifice of the gear pump assembly includes a screen and the passage receives flow passing only through the screen.

The first and second pump bearings of the gear pump assembly each include a bearing dam that segregates inlet and outlet sides of the intermeshing first and second pump gears, and the passage in each pump bearing interconnects opposite sides of the bearing dam.

The first and second pump bearings of the gear pump assembly each include a flat along a circumferential portion thereof, wherein the passages are formed in the respective flats of the pump bearings.

Each passage of the gear pump assembly includes a recess that extends inwardly from the respective flat so that the recesses are in fluid communication with one another when the flats of the first and second bearing members abut one another.

A primary benefit of the present disclosure is the ability to provide greater control over a filtered bearing feed flow.

Another advantage is to provide a redundant, bearing lubrication flow that is available in the event one of the lubrication feed orifices becomes clogged.

Yet another benefit resides in the ease with which known bearing designs can be modified to incorporate the modification to the bearing assembly.

Still other benefits and advantages will become more apparent from reading and understanding the following detailed description.

DETAILED DESCRIPTION

Figure 1:
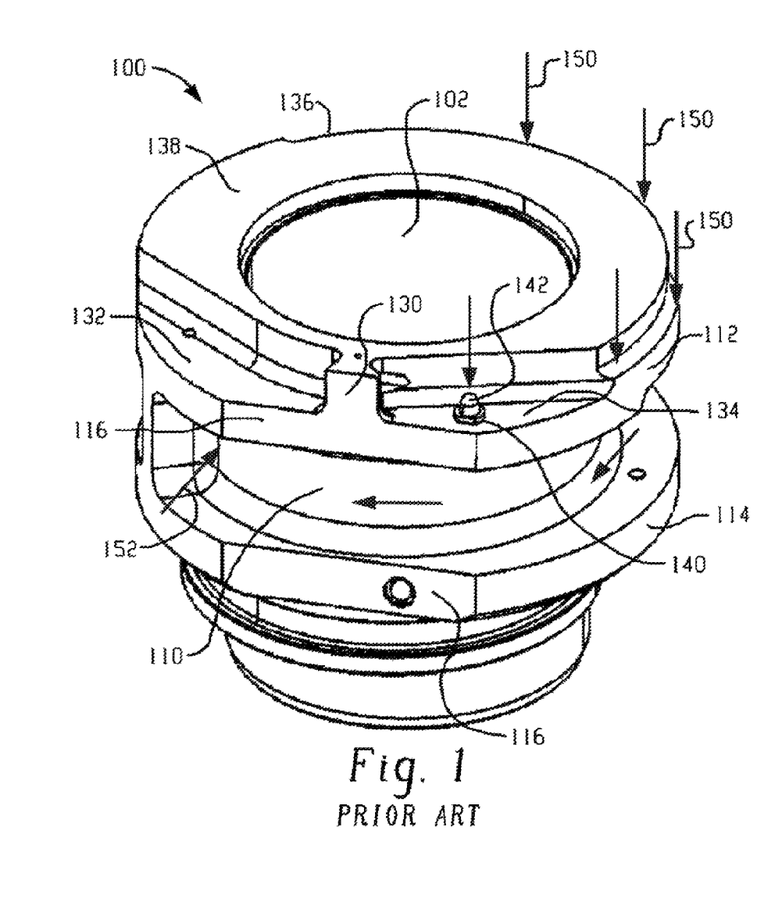
FIG. 1 is a pump bearing apparatus according to the prior art.
Figure 2:
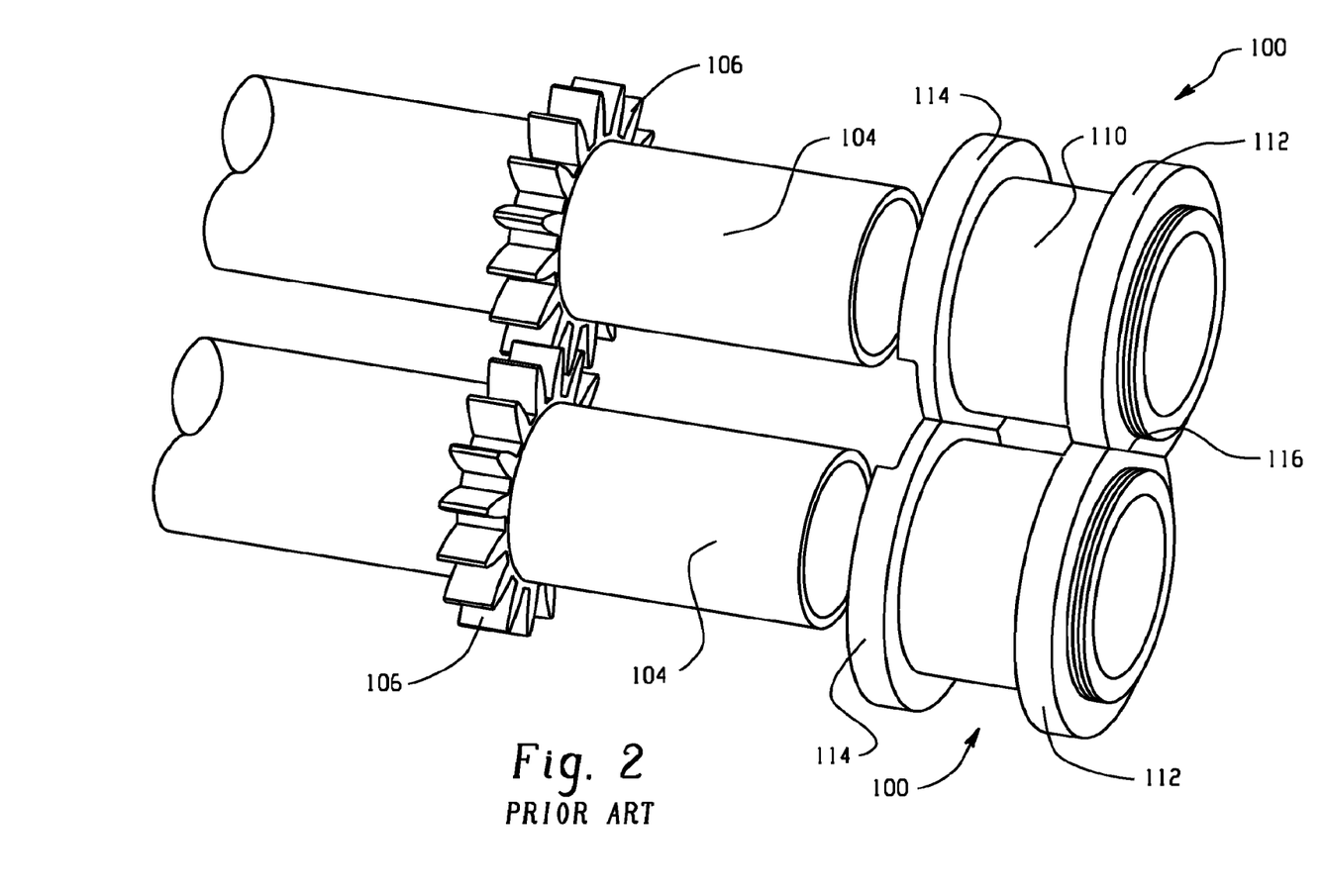
FIG. 2 is an exploded view of the pump gear and bearing assembly at one end of a gear pump.
Figure 3:
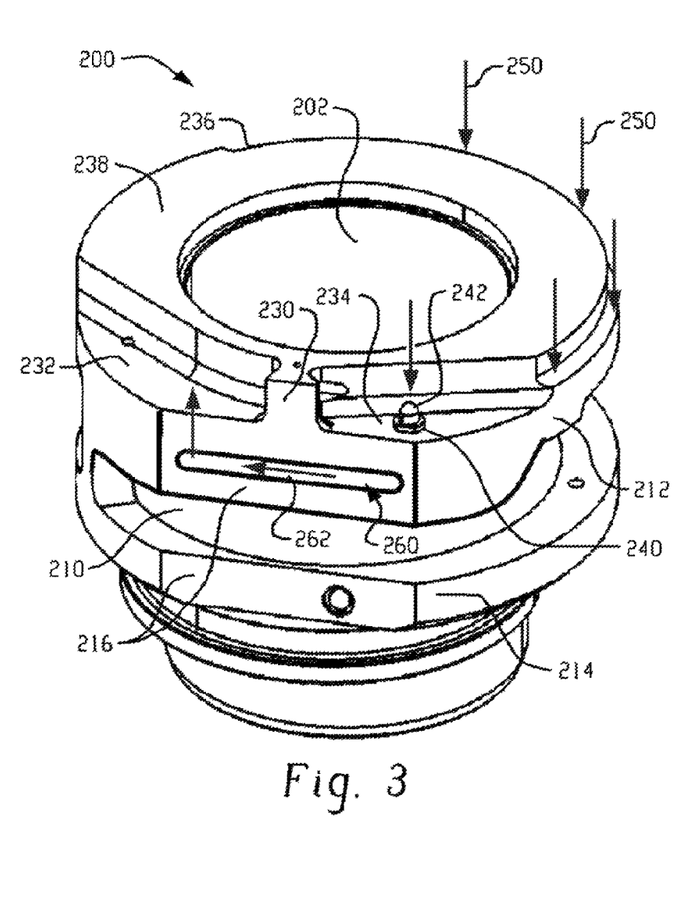
FIG. 3 is a pump bearing apparatus according to an embodiment of the invention.
Figure 4:
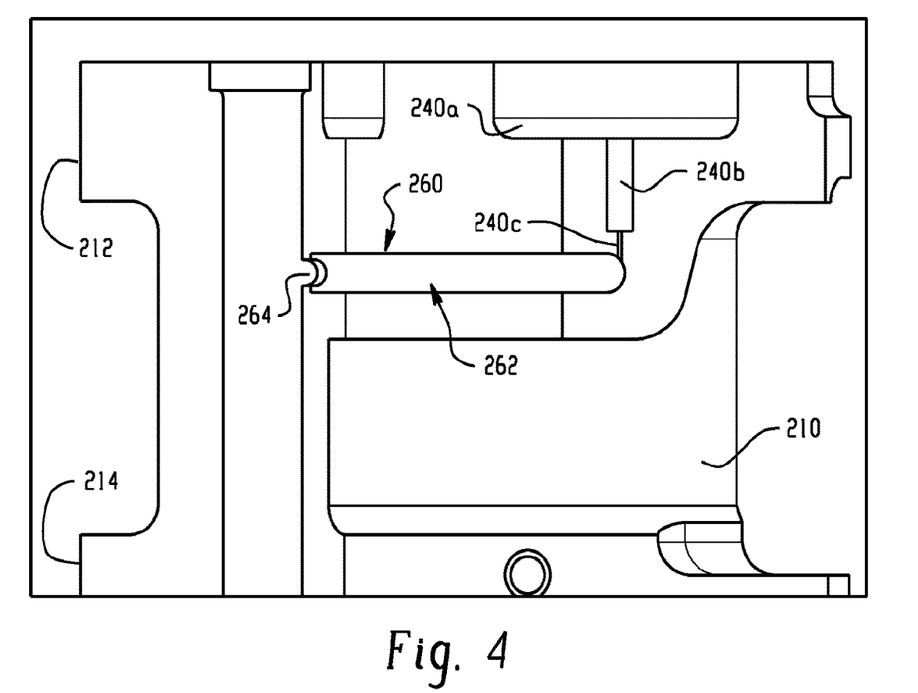
FIG. 4 is another view of the pump bearing apparatus according to an embodiment of the invention.
Figure 5:
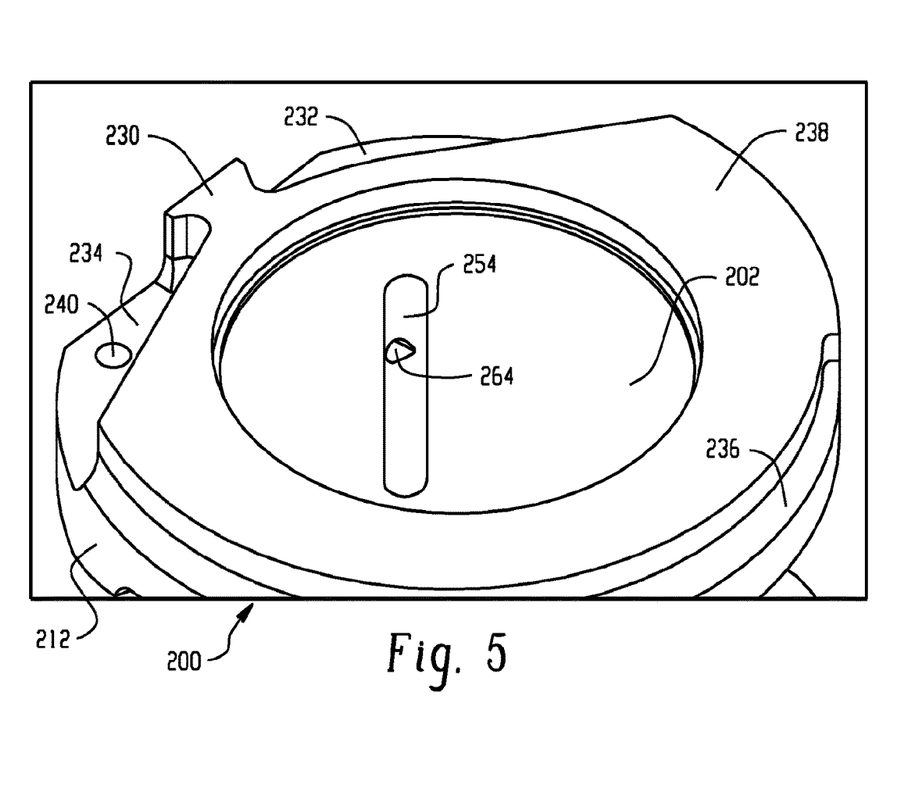
FIG. 5 is another view of the pump bearing apparatus according to an embodiment of the invention.
Figure 6:
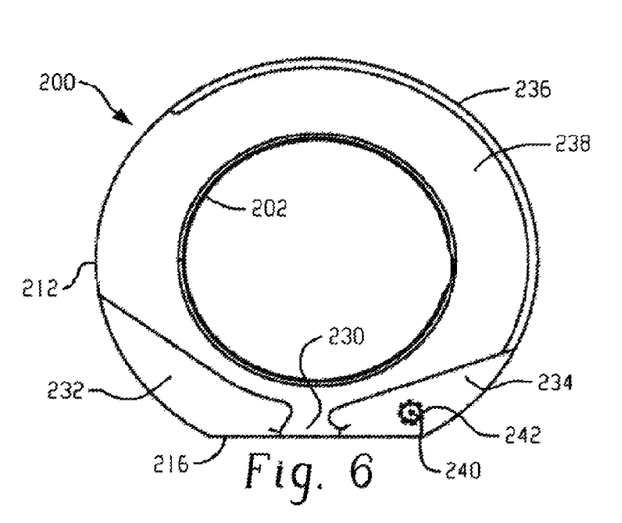
FIG. 6 is another view of the pump bearing apparatus according to an embodiment of the invention.
Figure 7:
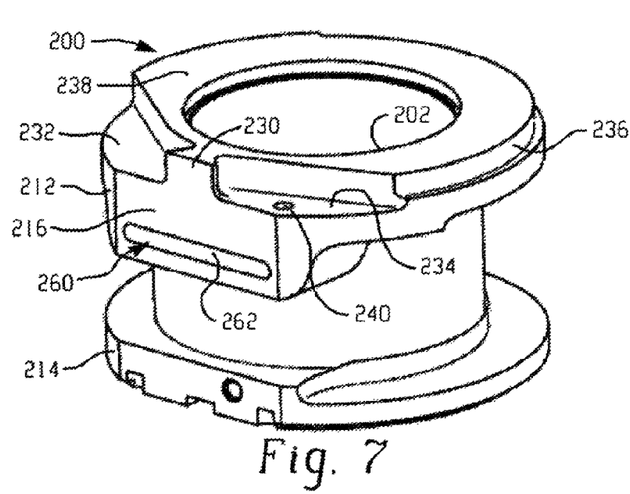
FIG. 7 is another view of the pump bearing apparatus according to an embodiment of the invention.
Figure 8:
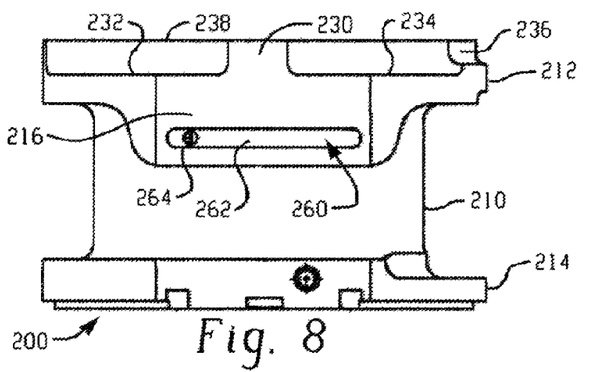
FIG. 8 is another view of the pump bearing apparatus according to an embodiment of the invention.
Figure 9:
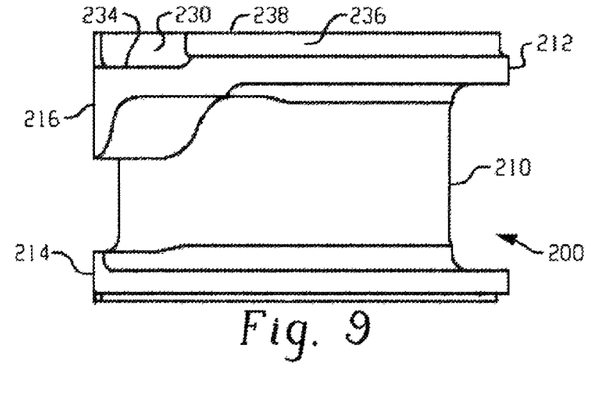
FIG. 9 is another view of the pump bearing apparatus according to an embodiment of the invention.

Turning initially to FIGS. 1 and 2, there is shown a pump bearing member 100 that includes a bore 102 therethrough that receives a shaft 104 of pump gear 106 as conventionally used in connection with a gear pump assembly. More specifically, the gear pump assembly includes first and second gears 106 mounted on parallel, respective shafts 104 so that the gears intermesh and pump an associated fluid (e.g., fuel) from an inlet side to side of the gears. Each shaft 104 is supported by a bearing member 100 and a bearing fluid is introduced between the shafts and bearing members. Thus, it will be appreciated that in many of the figures of the present application only a single bearing member is illustrated; however, the description of the structure and function of one bearing member, shaft, and gear arrangement is equally applicable to the other bearing member, shaft, and gear arrangement.

The bearing member 100 is a generally annular body formed by a spool 110 with axially spaced lands 112, 114. Flats 116 are formed in a portion of a perimeter of each land 112, 114, and the flats of the first bearing member 100 are formed for abutting engagement with the corresponding flats of the other bearing member (FIG. 2). At approximately a midpoint of the flat 116 of the first land 112 is a dam 130 that separates an inlet ramp 132 from a discharge ramp 134. The dam 130 separates a low pressure portion of the land 112 from a high pressure portion. That is, the bearing fluid envelops the bearing member 100 and supports the shaft 104 within the bearing member. A high pressure arc 136 extends axially inward from face 138 of the bearing member 100 and over a perimeter/circumferential portion of the land 112. The high pressure arc 136 aids in directing bearing fluid from the inlet ramp 132 toward the discharge ramp 134 to provide a desired flow of the bearing fluid. In addition, a pressure feed hole 140 is formed in the discharge ramp 134 and allows pressurized bearing fluid to be fed from the discharge ramp, through the land 112 toward the spool 110. A screen 142 is typically arranged over the pressure feed hole 140 to remove contaminants from the bearing fluid flow. As represented by reference arrows 150 in FIG. 1, radial gap flow of the bearing fluid (which may be possibly contaminated) flows between the bearing member 100 and the surrounding pump housing (not shown) that receives the bearing member. Thus, this arrangement provides for screened flow through the small passage pressure feed hole 142 to mix with radial gap flow 150 in the bearing spool 110 and thereby feed bearing fluid toward bearing lube groove (not shown in FIGS. 1 and 2) represented by reference arrow 152 where the pressurized, combined screen flow and radial gap flow is circulated toward the inlet ramp 132.

Referring to FIGS. 3-14, like reference numerals in the 200 series will refer to like components for purposes of brevity and ease of understanding. For example, pump bearing member 200 is referenced in FIGS. 3-14 and has similarities to bearing member 100 of FIG. 1 with the noted differences and improvements described below. Specifically, bearing member 200 is again an annular shaped body that has a spool 210 and first and second lands 212, 214. Flats 216 are provided along peripheral portions of the lands 212, 214 and are designed for mating, abutting engagement with the corresponding flats of an adjacent bearing member (e.g., FIG. 2). A dam 230 segregates inlet ramp 232 and discharge ramp 234 in generally the same manner as the prior art arrangement of FIG. 1. Likewise, a high pressure arc 236 extends axially inward from face 238 of the bearing member 200 and over a perimeter/circumferential portion of the land 212. Radial gap flow as represented by reference arrows 250 still flows between the bearing member 200 and the surrounding pump housing (not shown); however, the screened flow through opening 240 covered by the screen 242 is isolated and interconnected with screen flow from the adjacent bearing member. To achieve this, a passage 260 is provided in the first land 212. More particularly, the passage 260 is connected to and in fluid communication with the opening 240 that provides filtered flow from the discharge ramp 234. The opening 240 is shown as a series of interconnected, reduced diameter portions 240a, 240b, 240c that extend from the discharge ramp 234 axially through the land 212, the small diameter portion 240c of which is in fluid communication with passage 260.

The passage 260 is preferably formed by discrete portions including a recess 262 that extends radially inward from the face 216 of the first land 212 and a small diameter opening 264 that communicates with the feed bearing lube groove 254 (FIG. 5) to supply bearing flow to the gear shaft 104 (FIG. 2). Thus, in the preferred embodiment, filtered flow from the discharge ramp 234 via small diameter opening 240c is received at one end of the recess 262 and the filtered flow proceeds to opening 264 at the other end of the recess. The filtered flow through the passage 260 advantageously provides for greater control over a filtered bearing feed flow, i.e., the screened flow no longer mixes with the potentially contaminated radial gap flow in the region of the bearing spool 210 to feed the bearing groove as in the prior art arrangement of FIG. 1. Rather, only screened flow via opening 240 and passage 260 feeds the bearing lube groove 254. This arrangement does not interfere with the radial gap flow that still flows between the bearing member 200 and pump housing (not shown) as represented by the reference numerals 250.

Another advantage offered by this new arrangement is to provide a redundant, bearing lubrication flow that is available in the event one of the lubrication feed orifices 240 becomes clogged. More specifically, the recesses 262 in the mating flats 216 of abutting bearing numbers 200 are aligned and in fluid communication with one another (see FIGS. 10 and 14). If contaminants were to reduce or block screened flow from one of the openings 240 that receive filtered flow through screen 242, desired screened flow would not reach the passage 260. However, because the recesses 262 are joined to one another to form a combined passage 260, screened flow may be drawn from the passage 240 in the other bearing member 200. This increases the prospect for bearing lubrication flow to be supplied to the feed bearing lube groove 254 via passage 260.

Thus, there is disclosed a bearing body 200 that incorporates a gear-type pump bearing design, which ports fluid from a filter screen 242 located in a bearing assembly at the gear mesh outlet. The ported fluid is fed through a small diameter flow limiting orifice 240 and enters a slot or passage recess 262 included in a bearing flat 216. From the slot 262 included across the flat 216, flow exits through a passage 264 and enters the bearing to feed a bearing lubrication feature (e.g., pad) at the rotating interface with a gear shaft 104. The slot 262 is configured to provide the flow limiting, protected orifice in isolated communication with the bearing lubrication feature.

Figure 10:
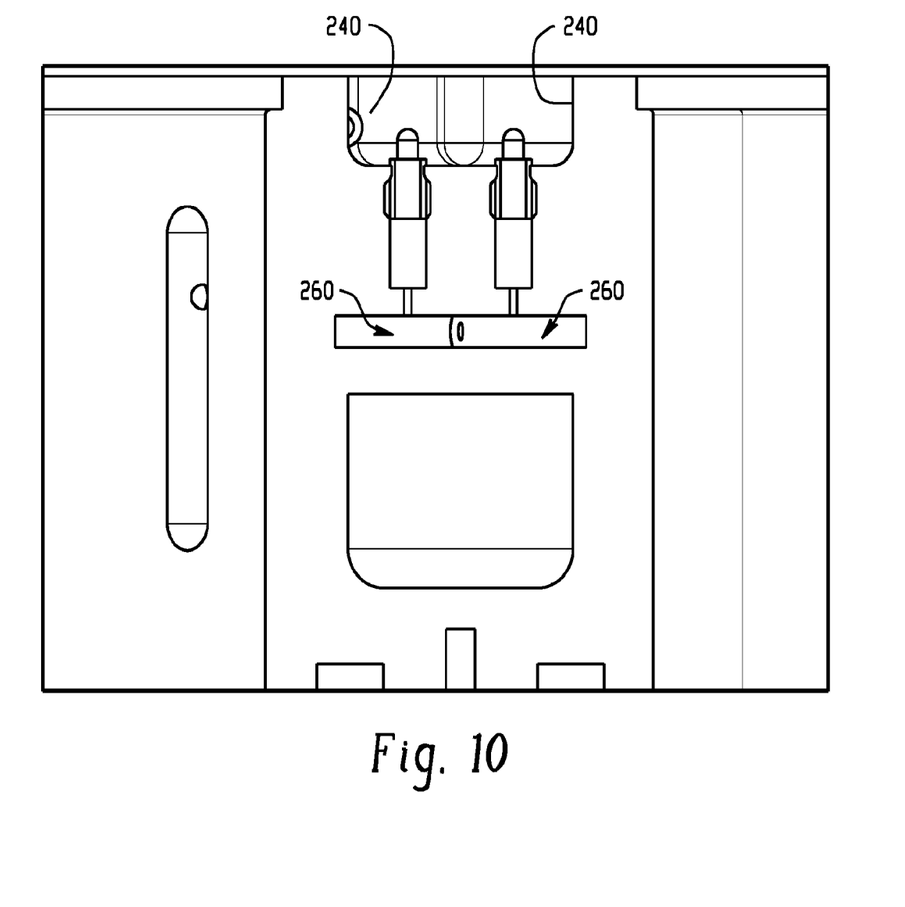
FIG. 10 is another view of the pump bearing apparatus according to an embodiment of the invention.
Figure 11:
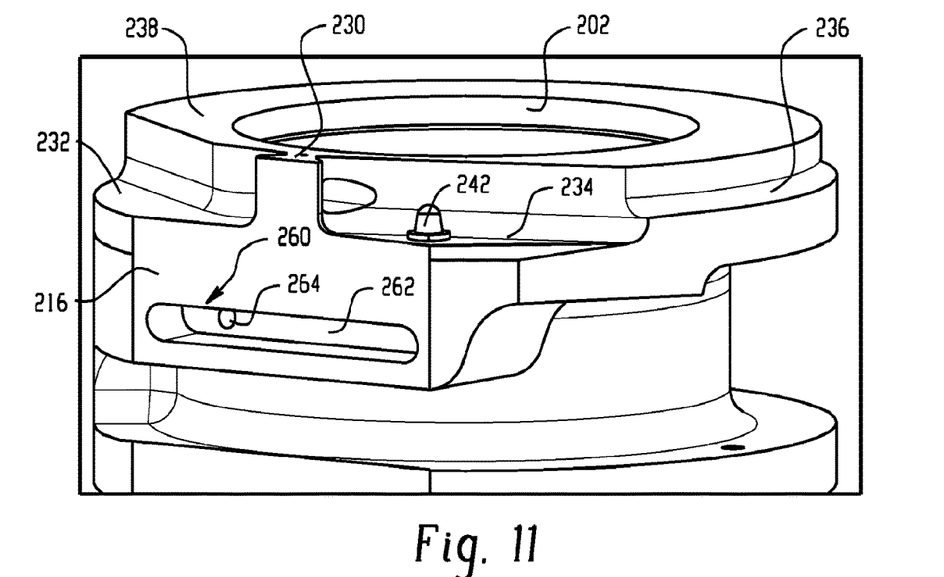
FIG. 11 is another view of the pump bearing apparatus according to an embodiment of the invention.
Figure 12:
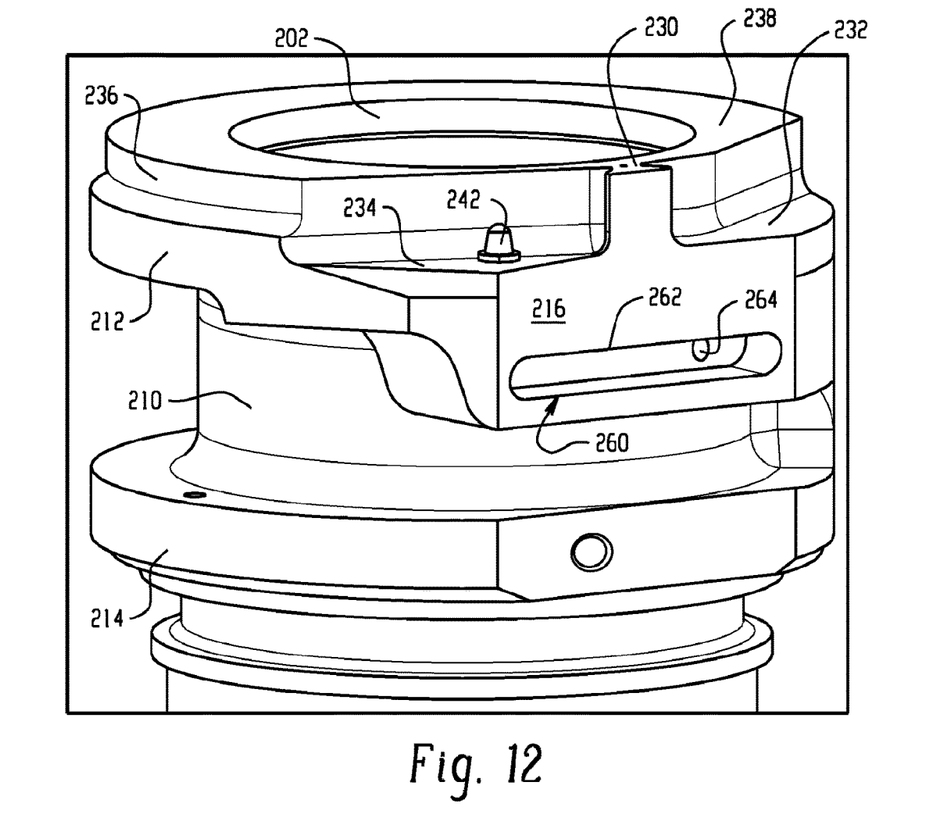
FIG. 12 is another view of the pump bearing apparatus according to an embodiment of the invention.
Figure 13:
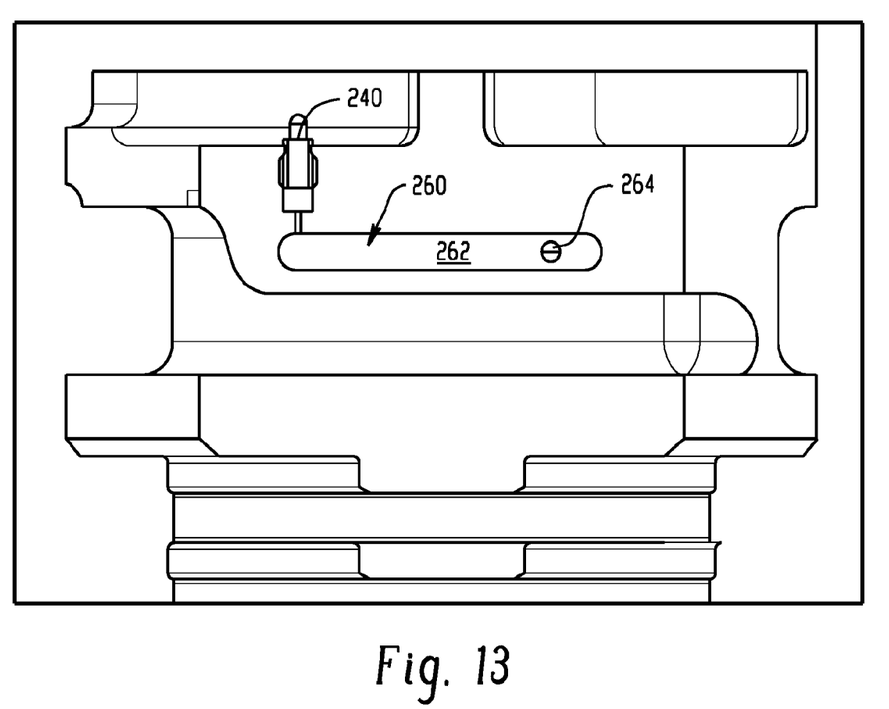
FIG. 13 is another view of the pump bearing apparatus according to an embodiment of the invention.
Figure 14:
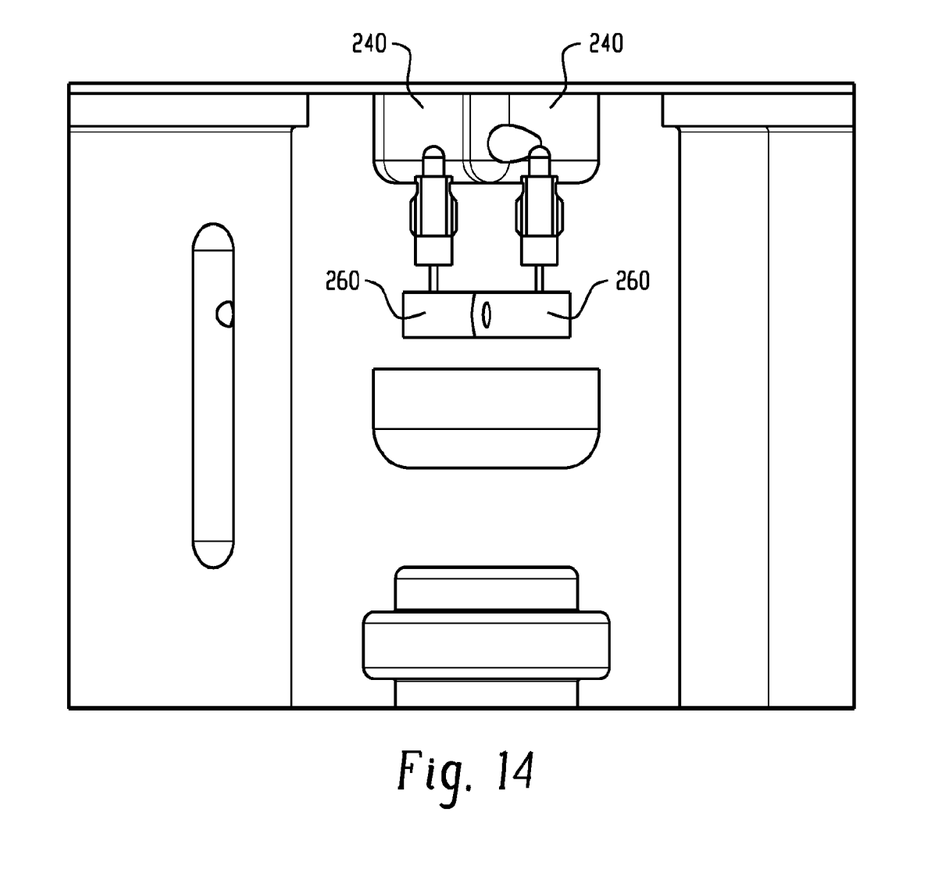
FIG. 14 is another view of the pump bearing apparatus according to an embodiment of the invention.

Comparing the prior art design shown in FIG. 1, the bearing members 200 shown in FIGS. 3-14 provide for redundant bearing feed flow when the mating gears 106 and bearing members 200 are placed in a pump assembly. As shown in FIGS. 10 and 14, once placed in a pump assembly (not shown), slots 262 in the face 216 of each bearing 200 align to form a common, clean (e.g., filtered) fluid manifold cavity for each bearing to draw its lubrication flow from. If a single screen 242 or its protected orifice 240 should become clogged, the screened, orificed flow supply from the mating bearing member 200 is available for both bearings in the assembled set. In this manner, the clean lubricating flow is isolated from the radial gap flow between the bearing 200 and the pump housing (not shown), which may be contaminated.

It is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A gear pump assembly, comprising:
a first pump gear and a second pump gear;
a bearing assembly including a first pump bearing and a second pump bearing that mates with the first pump bearing, the first pump bearings including a bearing body having a bearing lubrication feature that includes a flow limiting, protected orifice and a passage including a passage portion configured to receive isolated bearing flow from the protected orifice, the second pump bearing including a bearing body having a bearing lubrication feature that includes a flow limiting, protected orifice distinct and spaced from the first pump bearing protected orifice, and the second pump bearing further including a passage portion configured to receive isolated bearing flow from the second pump bearing protected orifice; and
wherein the passage portions in the first and second bearing members align to form a common, fluid internal passage portion from which each of the first and second bearings can draw lubrication flow from either or both of the distinct protected orifices of the first and second pump bearings, respectively.

2. The pump bearing assembly of claim 1 wherein the protected orifice of each pump bearing includes a screen and the passage portion receives flow passing through the screen.

3. The gear pump assembly of claim 1 wherein the protected orifices each includes a screen and the passage receives flow passing only through the screen of either the first and second bearing members.

4. The gear pump assembly of claim 1 wherein the first and second pump bearings each include a bearing dam that segregates inlet and outlet sides of the intermeshing first and second pump gears, and the passage portion in each pump bearing extends between opposite inlet and outlet sides of the bearing dam.

5. The gear pump assembly of claim 1 wherein the first and second pump bearings each includes a flat along a circumferential portion thereof.

6. The gear pump assembly of claim 5 wherein the passage portions are formed in the respective flats of the first and second pump bearings.

7. The gear pump assembly of claim 6 wherein each passage portion includes a recess that extends inwardly from the respective flat so that the recesses are in fluid communication with one another when the flats of the first and second pump bearings abut one another.

8. The gear pump assembly of claim 7 wherein the first and second pump bearings each include a dam that segregates inlet and outlet sides of the first and second pump gears supported by the pump bearing assembly, and the passage portions extend between opposite inlet and outlet sides of the bearing dams.

9. The gear pump assembly of claim 1 further comprising first and second screens that cover respective ones of the protected orifices, and wherein the passage of each of the first and second pump bearings includes a flow limiting orifice having a cross sectional dimension smaller than the protected orifice, the flow limiting orifice receiving flow at a first end from the screen of the protected orifice and having a second end that communicates with the passage portions.

\* \* \* \* \*